US012703392B2

(12) United States Patent
Silva et al.

(10) Patent No.: US 12,703,392 B2
(45) Date of Patent: Aug. 11, 2026

(54) SYSTEMS AND METHODS FOR ASSISTING A DRIVER USING A FOUNDATION MODEL IN A SHARED-AUTONOMY DRIVING MODE OF A VEHICLE

(71) Applicant: Toyota Research Institute, Inc., Los Altos, CA (US)

(72) Inventors: Andrew Michael Silva, Cambridge, MA (US); Emily Sarah Sumner, Cambridge, MA (US); Jonathan A. DeCastro, Arlington, MA (US); Deepak Edakkattil Gopinath, Washington, DC (US); Thomas M. Balch, Damariscotta, ME (US); Xiongyi Cui, Somerville, MA (US); Guy Rosman, Cambridge, MA (US)

(73) Assignees: Toyota Research Institute, Inc., Los Altos, CA (US); Toyota Jidosha Kabushiki Kaisha, Toyota (JP)

( * ) Notice: Subject to any disclaimer, the term of this patent is extended or adjusted under 35 U.S.C. 154(b) by 33 days.

(21) Appl. No.: 18/926,741

(22) Filed: Oct. 25, 2024

(65) Prior Publication Data

US 2026/0116418 A1 Apr. 30, 2026

(51) Int. Cl.
*B60W 60/00* (2020.01)
*B60Q 1/14* (2006.01)
(Continued)

(52) U.S. Cl.
CPC ............. *B60W 60/001* (2020.02); *B60Q 1/14* (2013.01); *B60Q 1/346* (2013.01); *B60Q 5/005* (2013.01);
(Continued)

(58) Field of Classification Search
CPC .... B60W 60/001; B60W 10/18; B60W 10/20; B60W 10/30; B60W 50/0097; B60W 50/10; B60W 50/14; B60W 2540/21; B60W 2540/229; B60Q 1/14; B60Q 1/346; B60Q 5/005
See application file for complete search history.

(56) References Cited

PUBLICATIONS

Chen, Detection of distracted driving via edge artificial intelligence (Year: 2023).*
(Continued)

*Primary Examiner* — Aryan E Weisenfeld
(74) *Attorney, Agent, or Firm* — Christopher G. Darrow; Darrow Mustafa, PC

(57) ABSTRACT

Systems and methods for assisting a driver using a foundation model in a shared-autonomy driving mode of a vehicle are disclosed herein. One embodiment of a shared-autonomy assistance subsystem processes, in a vehicle operating in a shared-autonomy driving mode, inputs including vehicle state information, external-road-agent state information, vehicle environmental sensor data, and map data using one or more encoder neural networks that have been trained to extract features for a large language model (LLM). The subsystem inputs the extracted features to the LLM. The subsystem predicts, using the LLM, an objective of a driver of the vehicle. The subsystem then executes, based on an output from the LLM, one or more actions to assist the driver in meeting the predicted objective. The one or more actions include controlling, at least in part, operation of the vehicle.

18 Claims, 4 Drawing Sheets

(51) Int. Cl.
*B60Q 1/34* (2006.01)
*B60Q 5/00* (2006.01)
*B60W 10/18* (2012.01)
*B60W 10/20* (2006.01)
*B60W 10/30* (2006.01)
*B60W 50/00* (2006.01)
*B60W 50/10* (2012.01)
*B60W 50/14* (2020.01)

(52) U.S. Cl.
CPC ............ *B60W 10/18* (2013.01); *B60W 10/20* (2013.01); *B60W 10/30* (2013.01); *B60W 50/0097* (2013.01); *B60W 50/10* (2013.01); *B60W 50/14* (2013.01); *B60W 2540/21* (2020.02); *B60W 2540/229* (2020.02); *B60W 2540/30* (2013.01)

(56) References Cited

PUBLICATIONS

Huang et al. "DriVLMe: Enhancing LLM-based Autonomous Driving Agents with Embodied and Social Experiences." arXiv preprint arXiv:2406.03008 (2024) (12 pages). Available at https://acrobat.adobe.com/id/urn:aaid:sc:VA6C2:23533d4b-0392-495f-ae14-8a4530a479f7.

Cui et al. "No, to the right: Online language corrections for robotic manipulation via shared autonomy." Proceedings of the 2023 ACM/IEEE International Conference on Human-Robot Interaction. 2023. (9 pages) Available at https://acrobat.adobe.com/id/urn:aaid:sc:VA6C2:4ba0b57d-8195-4c0f-8751-2d29a5ed4ea9.

Mao et al. "Gpt-driver: Learning to drive with gpt." arXiv preprint arXiv:2310.01415 Foundation Models for Decision Making Workshop at NeurIPS (2023) (12 pages). Available at: https://acrobat.adobe.com/id/urn:aaid:sc:VA6C2:5a1fb29f-431e-4c7b-a567-3792a533fbce.

Jang et al. "Unlocking Robotic Autonomy: A Survey on the Applications of Foundation Models." International Journal of Control, Automation and Systems 22.8 (2024) (37 pages) Available at: https://acrobat.adobe.com/id/urn:aaid:sc:VA6C2:f3553f1e-f177-4963-94d0-a9a6b9d9b28e.

Akshay Bhardwaj, Haptic Steering Interfaces for Semi-Autonomous Vehicles. Diss. University of Michigan (2021) (128 pages) Available at: https://acrobat.adobe.com/id/urn:aaid:sc:VA6C2:8ec6e911-8ef3-457d-a865-ed39b5d0ddd4.

Chen et al. "Driving with llms: Fusing object-level vector modality for explainable autonomous driving." 2024 IEEE International Conference on Robotics and Automation (ICRA). IEEE, (2023)(19 pages) Available at: https://acrobat.adobe.com/id/urn:aaid:sc:VA6C2:5bcb41f7-5209-4a8f-b9c2-eb595780c281.

Yin et al. "Lamm: Language-assisted multi-modal instruction-tuning dataset, framework, and benchmark." Advances in Neural Information Processing Systems 36 (2024). (36 pages) Available at: https://arxiv.org/pdf/2306.06687.

Driess et al. "Palm-e: An embodied multimodal language model." arXiv preprint arXiv:2303.03378 (2023). (18 pages) Available at: https://palm-e.github.io/assets/palm-e.pdf.

Liu et al. "Visual instruction tuning." Advances in neural information processing systems 36 (2024). (25 pages) Available at: https://arxiv.org/pdf/2304.08485.

Li et al. "Blip-2: Bootstrapping language-image pre-training with frozen image encoders and large language models." International conference on machine learning. PMLR, 2023. (13 pages). Available at: https://arxiv.org/pdf/2301.12597.

Sun et al. "Fine-grained audio-visual joint representations for multimodal large language models." arXiv preprint arXiv:2310.05863 (2023). (20 pages) Available at: https://openreview.net/pdf?id=wD8L86iCvD.

Zhu et al. "Minigpt-4: Enhancing vision-language understanding with advanced large language models." arXiv preprint arXiv:2304.10592 (2023).(15 pages) Available at: https://arxiv.org/pdf/2304.10592.

* cited by examiner

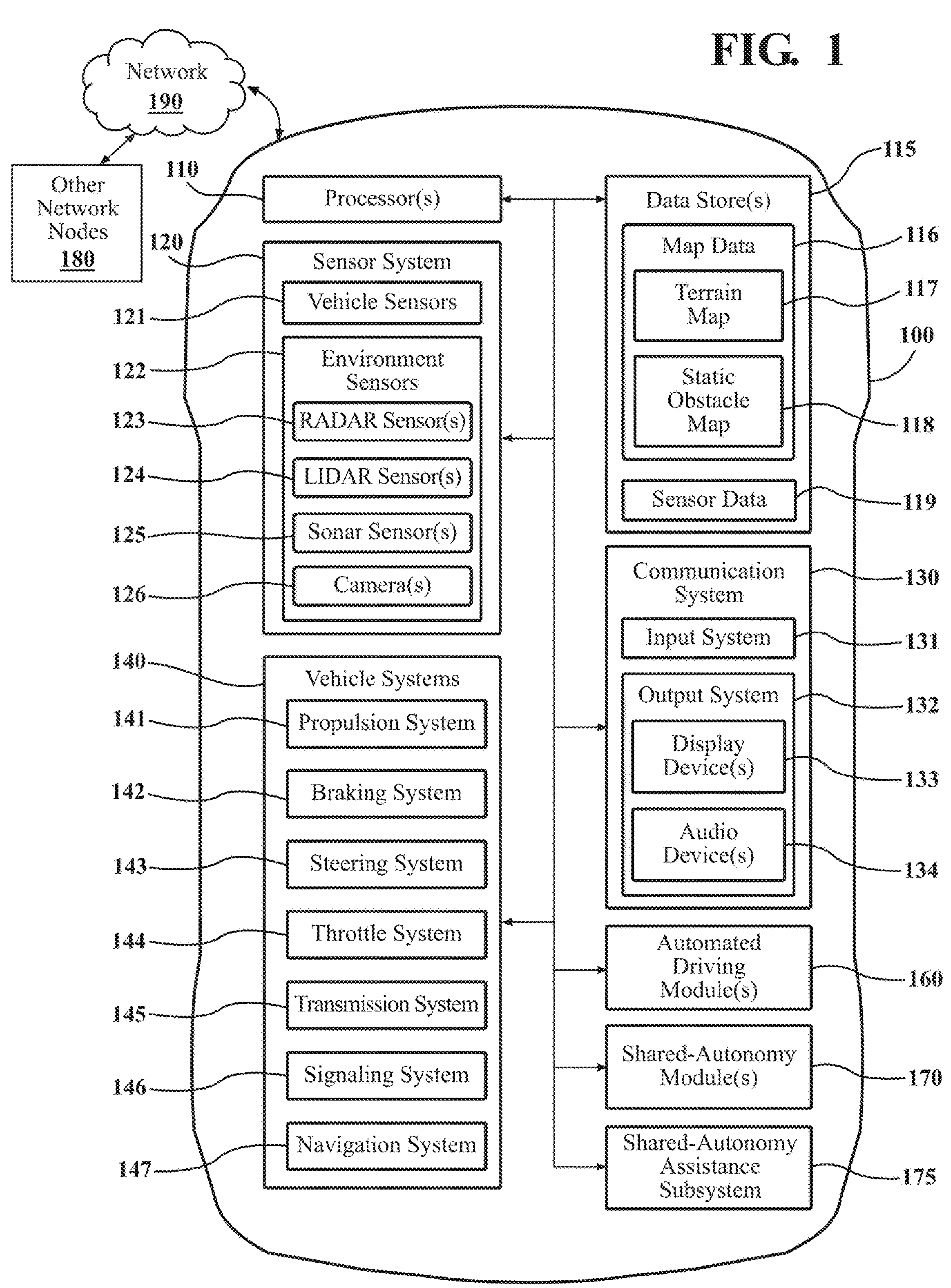
FIG. 1
Network
190
Other Network Nodes
180
110
Processor(s)
120
Sensor System
121
Vehicle Sensors
122
Environment Sensors
123
RADAR Sensor(s)
124
LIDAR Sensor(s)
125
Sonar Sensor(s)
126
Camera(s)
140
Vehicle Systems
141
Propulsion System
142
Braking System
143
Steering System
144
Throttle System
145
Transmission System
146
Signaling System
147
Navigation System
115
Data Store(s)
116
Map Data
117
Terrain Map
100
Static Obstacle Map
118
Sensor Data
119
Communication System
130
Input System
131
Output System
132
Display Device(s)
133
Audio Device(s)
134
Automated Driving Module(s)
160
Shared-Autonomy Module(s)
170
Shared-Autonomy Assistance Subsystem
175

SYSTEMS AND METHODS FOR ASSISTING A DRIVER USING A FOUNDATION MODEL IN A SHARED-AUTONOMY DRIVING MODE OF A VEHICLE

TECHNICAL FIELD

The subject matter described herein generally relates to vehicles and, more particularly, to systems and methods for assisting a driver using a foundation model in a shared-autonomy driving mode of a vehicle.

BACKGROUND

Virtual assistants are becoming increasingly popular in a variety of applications, including in vehicles. Vehicular virtual assistant technology can be improved to better assist drivers and other vehicle occupants.

SUMMARY

An example of a system for assisting a driver using a foundation model in a shared-autonomy driving mode of a vehicle is presented herein. The system comprises a processor and a memory storing machine-readable instructions that, when executed by the processor, cause the processor to process, in a vehicle operating in a shared-autonomy driving mode, inputs including vehicle state information, external-road-agent state information, vehicle environmental sensor data, and map data using one or more encoder neural networks that have been trained to extract features for a large language model (LLM). The memory also stores machine-readable instructions that, when executed by the processor, cause the processor to input the extracted features to the LLM. The memory also stores machine-readable instructions that, when executed by the processor, cause the processor to predict, using the LLM, an objective of a driver of the vehicle. The memory also stores machine-readable instructions that, when executed by the processor, cause the processor to execute, based on an output from the LLM, one or more actions to assist the driver in meeting the predicted objective. The one or more actions include controlling, at least in part, operation of the vehicle.

Another embodiment is a non-transitory computer-readable medium for assisting a driver using a foundation model in a shared-autonomy driving mode of a vehicle and storing instructions that when executed by a processor cause the processor to process, in a vehicle operating in a shared-autonomy driving mode, inputs including vehicle state information, external-road-agent state information, vehicle environmental sensor data, and map data using one or more encoder neural networks that have been trained to extract features for a large language model (LLM). The instructions also cause the processor to input the extracted features to the LLM. The instructions also cause the processor to predict, using the LLM, an objective of a driver of the vehicle. The instructions also cause the processor to execute, based on an output from the LLM, one or more actions to assist the driver in meeting the predicted objective. The one or more actions include controlling, at least in part, operation of the vehicle.

In another embodiment, a method of assisting a driver using a foundation model in a shared-autonomy driving mode of a vehicle is disclosed. The method comprises processing, in a vehicle operating in a shared-autonomy driving mode, inputs including vehicle state information, external-road-agent state information, vehicle environmental sensor data, and map data using one or more encoder neural networks that have been trained to extract features for a large language model (LLM) and inputting the extracted features to the LLM. The method also includes predicting, using the LLM, an objective of a driver of the vehicle. The method also includes executing, based on an output from the LLM, one or more actions to assist the driver in meeting the predicted objective. The one or more actions include controlling, at least in part, operation of the vehicle.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIG. 1 illustrates a vehicle in which various embodiments of the systems and methods disclosed herein can be implemented.

To facilitate understanding, identical reference numerals have been used, wherever possible, to designate identical elements that are common to the figures. Additionally, elements of one or more embodiments may be advantageously adapted for utilization in other embodiments described herein.

DETAILED DESCRIPTION

Figure 2:
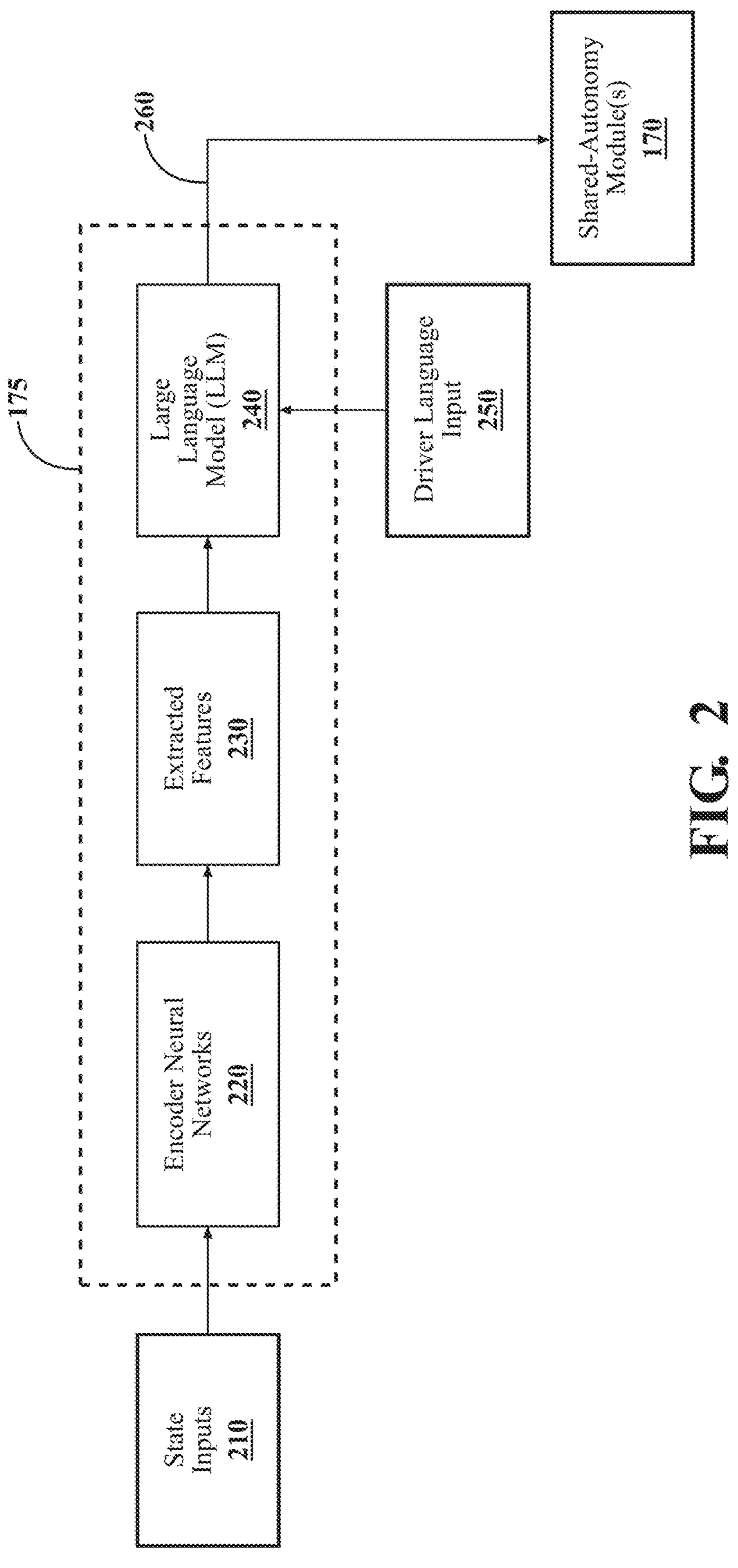
FIG. 2 is a block diagram of a shared-autonomy assistance subsystem that includes a foundation model, in accordance with an illustrative embodiment of the invention.

Over the past few years, vehicular virtual assistant technology has advanced to include the use of generative-artificial-intelligence (AI) foundation models such as large language models (LLMs). However, existing designs apply such models to highly or fully automated driving. The various embodiments described herein address a void in the prior art by providing a LLM-based virtual assistant that, in a shared-autonomy setting, infers an unstated ultimate intention or objective of a human driver in a manner analogous to how a LLM, in a more typical application, predicts the remainder of a sentence given the start of the sentence. Having inferred the driver's ultimate intention or objective, the virtual assistant can generate actions to assist the driver in meeting the inferred intention or objective. For example, the virtual assistant can generate actions for execution by the automated-driving aspect of the shared-autonomy system of the vehicle that align with the driver's intention or objective. Such actions involve controlling, at least in part, the operation of the vehicle (e.g., controlling one or more of steering, acceleration, and braking). In some embodiments, the actions can include controlling the operation of the vehicle in other respects, such as, without limitation, the LLM advising the driver, warning the driver, activating a turn signal, controlling headlight high beams, activating a horn, controlling hazard lights, and/or controlling windshield wipers.

Herein, the term "shared autonomy" refers to a vehicle control arrangement in which the vehicle is equipped with an automated driving system, but a human driver can provide feedback or corrections to the automated driving system via the steering wheel, accelerator, and/or brake when the vehicle is operating in a shared-autonomy driving mode. Such a system blends (combines) the control inputs of the driver with the automated control decisions of the automated driving system, weighting the two control inputs in an intelligent manner in accordance with the currently detected driving situation and the driver's inferred intention or objective. Such an arrangement is sometimes referred to in the art as "blended control."

A foundation model such as a LLM has built-in "common sense" and knowledge of the world, approximately knowing how people tend to behave in various situations, what they like, etc. In the various embodiments of a shared-autonomy assistance subsystem described herein, an LLM is further trained (specialized) to understand state transitions and how the world works in a vehicle-driving context. The LLM-based virtual assistant perceives what is happening by observing the state of the vehicle, the actions/behavior of the driver, the states of other nearby vehicles, and the external environment in the vicinity of the vehicle. Based on these inputs, the virtual assistant infers (predicts or estimates) the driver's intent or objective ("What is the driver trying to do?"). Examples include, without limitation, changing lanes; executing a turn at an intersection; merging; exiting a roadway; overtaking another vehicle; remaining in a current lane behind a leading vehicle; and focusing attention on a non-driving activity that distracts the driver from driving, resulting in the vehicle drifting within its lane or other exhibiting other aberrant maneuvering.

By being able to reason over what the driver is thinking, what the driver is trying to accomplish, or even in what ways the driver might be compromised (impaired), the various embodiments can output control actions that meet the inferred intent/objective. Examples include, without limitation, blending automated control of the vehicle with the driver's own control inputs to help the driver pass another vehicle more smoothly or more quickly, making the drive more comfortable, and keeping the vehicle and its occupants safer in situations where the driver might be trying to do something that the driver is not capable of. In the various embodiments, the assistance subsystem can reason over important instances in which the assistance subsystem "gets it wrong" (i.e., where the control inputs of the driver and the automated driving system clash), and the driver responds with a corrective input to the vehicle's controls, such as abruptly turning the steering wheel to counter an automated maneuver (e.g., keeping the vehicle traveling straight instead of turning right at an intersection). Such a corrective input from the driver is highly informative for the embodiments described herein because it teaches the assistance subsystem that the inferred driver intent was incorrect, so the assistance subsystem either gets out of the way or "pivots" in what it attempts to provide to the driver as assistance.

Referring to FIG. 1, it depicts a vehicle 100 in which various embodiments of a shared-autonomy assistance subsystem can be implemented. As used herein, a "vehicle" is any form of motorized transport. One example of a "vehicle," without limitation, is an automobile. As shown in FIG. 1, vehicle 100 can include a shared-autonomy assistance subsystem 175, which is described in detail below. Hereinafter, shared-autonomy assistance subsystem 175 will sometimes be referred to simply as the "subsystem 175" for brevity. The various embodiments of a shared-autonomy assistance subsystem 175 described herein are themselves "systems," as understood by those skilled in the art. The term "subsystem" is used herein simply to denote that the shared-autonomy assistance subsystem is an aspect of the overall shared-autonomy driving system of the vehicle 100. More specifically, the shared-autonomy assistance subsystem 175 is a generative AI-based virtual-assistant aspect of the shared-autonomy driving system of a vehicle 100. Consequently, "shared-autonomy assistance subsystem 175" and "generative AI-based virtual assistant" (often shortened herein to simply the "virtual assistant") are used interchangeably, in this description.

In embodiments, vehicle 100 includes an automated driving system, of which automated driving module(s) 160 are a part, that enables vehicle 100 to operate in a semi-automated or automated driving mode. For example, in some embodiments, vehicle 100 can operate at a high or total level of autonomy (e.g., Society of Automotive Engineers Autonomy Levels 3-5). In other embodiments, vehicle 100 can operate in a semi-automated driving mode by virtue of features such as adaptive cruise-control (ACC), automatic lane-change assistance, automatic lane-keeping, and automatic parking assistance. Such features, in some embodiments, are part of an Advanced Driver-Assistance System (ADAS) (not shown in FIG. 1).

Additionally, vehicle 100 includes shared-autonomy module(s) 170 that operate in conjunction with the automated driving module(s) 160 just mentioned to implement a shared-autonomy driving system in vehicle 100 (not shown in FIG. 1). The shared-autonomy module(s) 170 implement the blended control of vehicle 100 discussed above, in which control inputs from the automated driving system and a human driver are intelligently combined. As mentioned above, the shared-autonomy assistance subsystem 175 is an aspect of the shared-autonomy driving system of vehicle 100. For example, the subsystem 175 can communicate with the shared-autonomy module(s) 170 to cause the execution of assistive actions that are, to the extent possible, consistent with a predicted intention or objective of the driver of vehicle 100. As explained above, the driver's objective is inferred by a LLM-based virtual assistant (subsystem 175).

As indicated in FIG. 1, the vehicle 100 includes additional elements. It will be understood that, in various embodiments, it may not be necessary for the vehicle 100 to have all the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1, including shared-autonomy assistance subsystem 175. While the various elements are shown as being located within the vehicle 100 in FIG. 1, it will be understood that one or more of these elements can be located external to the vehicle 100. Further, the elements shown may be physically separated by large distances. Some of the possible elements of the vehicle 100 are shown in FIG. 1. However, a description of many of the elements in FIG. 1 will be provided after the discussion of FIGS. 2-4 for purposes of brevity of this description.

Sensor system 120 can include one or more vehicle sensors 121. Vehicle sensors 121 can include one or more positioning systems such as a dead-reckoning system or a global navigation satellite system (GNSS) such as a global positioning system (GPS). Vehicle sensors 121 can also include Controller-Area-Network (CAN) sensors that output, for example, speed and steering-angle data pertaining to vehicle 100. Sensor system 120 can also include one or more environment sensors 122. Environment sensors 122 generally include, without limitation, radar sensor(s) 123, Light Detection and Ranging (LIDAR) sensor(s) 124, sonar sensor(s) 125, and camera(s) 126. One or more of these various types of environment sensors 122 can be used to detect objects (e.g., external road agents such as other vehicles, bicyclists, motorcyclists, pedestrians, and animals) and, in other respects, understand the environment surrounding connected vehicle 100 and its associated traffic situations and conditions. This process is sometimes referred to as "traffic-situation understanding" or "scene understanding." In some embodiments, sensor system 120 includes sensors (e.g., cameras in the passenger compartment, biological sensors, etc.) to monitor the state of the driver or other vehicle occupants. For example, in those embodiments, the interior environment sensors 122 enable the subsystem 175 to track the driver's gaze direction, recognize the driver's facial expressions, etc.

As shown in FIG. 1, vehicle 100 can include an output system 132. In some embodiments, the virtual assistant communicates with the driver of vehicle 100 via display device(s) 133 and/or audio device(s) 134. The driver or other vehicle occupants can, in turn, communicate with the virtual assistant (make requests, ask questions, etc.) via one or more microphones (not shown in FIG. 1) and/or a device for inputting text prompts.

As also shown in FIG. 1, in some embodiments, vehicle 100 is a connected vehicle that can communicate with other network nodes 180 (e.g., other connected vehicle, cloud servers, edge servers, roadside units, infrastructure devices, etc.) via a network 190. In some embodiments, network 190 includes the Internet. In communicating with the other network nodes 180, vehicle 100 can make use of wireless communication technologies such as cellular data, Bluetooth®, Bluetooth® Low Energy (LE), and Dedicated Short-Range Communications (DSRC).

FIG. 2 is a block diagram of a shared-autonomy assistance subsystem 175 that includes a foundation model, in accordance with an illustrative embodiment of the invention. In this embodiment, the foundation model is a LLM 240. As discussed above, the subsystem 175 functions as a generative AI-based virtual assistant that is an aspect of a shared-autonomy driving system of a vehicle 100. As shown in FIG. 2, one or more previously trained encoder neural networks 220 process the state inputs 210 to produce the extracted features 230. State inputs 210 include, without limitation, vehicle state information (e.g., location, speed, pose, steering angle, etc.) from vehicle sensors 121, external-road-agent state information (e.g., location and speed) from environment sensors 122 or connected-vehicle communications, vehicle environmental sensor data from environment sensors 122, and map data 116. State inputs 210 also include, in a shared-autonomy driving mode of vehicle 100, the driver's vehicle-control inputs, such as turning the steering wheel, operating the throttle, and/or operating the brake. State inputs 210, in some embodiments, include sensor data pertaining to the state of the driver, such as detecting the driver's gaze direction, facial expressions, detected level of alertness and attentiveness (e.g., the kinds of data output by a driver monitoring system).

The trained encoder neural networks 220 process the diverse types of data, including image data, in the state inputs 210 to generate extracted features 230 that can be input to and interpreted by a LLM 240. This enables the LLM 240 to analyze specialized types of data pertaining to vehicles and driving that are beyond the scope of a generic LLM. In some embodiments, the encoder neural networks 220 include Visual Language Models (VLMs) that process image data and output feature vectors that are input to the LLM 240 and processed by the LLM 240 in a manner similar to how the LLM 240 processes text. Such a feature vector is analogous to a word of text. As shown in FIG. 2, driver language input 250 (e.g., speech and/or text) is also input to the LLM 240. Driver language input 250 does not require a specially trained encoder neural network 220 because it is already in a form that the LLM 240 can interpret.

Based on the present state inputs 210 and any other inputs (e.g., a driver language input 250), the LLM 240 predicts an objective of the driver of vehicle 100. In some embodiments, subsystem 175 includes a diffusion model that, at least in part, implements the predictive aspect of the subsystem. As discussed above, examples of driver objectives (or intentions) include, without limitation, changing lanes; executing a turn at an intersection; merging; exiting a roadway; overtaking another vehicle; remaining in a current lane behind a leading vehicle; and focusing attention on a non-driving activity that distracts the driver from driving, resulting in the vehicle drifting within its lane or exhibiting other aberrant maneuvering.

As shown in FIG. 2, LLM 240 outputs one or more assistive actions 260, some or all of which can be executed by the shared-autonomy module(s) 170 in the vehicle's shared-autonomy driving system. For example, as discussed above, the LLM 240 can generate actions for execution by the automated-driving aspect of the shared-autonomy system of the vehicle that align with the driver's predicted objective. Such actions involve controlling, at least in part, the operation of the vehicle (e.g., controlling one or more of steering, acceleration, and braking) while, to the extent possible, retaining (acting consistently with) the predicted objective of the driver. In some embodiments, the actions can include controlling other aspects of the operation of the vehicle 100, such as, without limitation, the LLM 240 advising the driver, warning the driver, activating a turn signal, controlling headlight high beams, activating a horn, controlling hazard lights, and/or controlling the vehicle's windshield wipers.

An important advantage of the various embodiments of a shared-autonomy assistance subsystem 175 described herein is that, being a foundation model, the LLM 240 has a richer understanding of the world than conventional vehicular virtual assistants. As those skilled in the art are aware, a generic LLM trained on voluminous data can be shown a relatively small number of examples of a new interaction mode (i.e., shared-autonomy driving), and the model builds something coherent to assist the driver in accordance with those examples. To illustrate these advantages in greater detail, three non-limiting sample use cases are discussed below.

In a first sample use case, the human driver of a vehicle 100 is looking around in confusion as vehicle 100 nears the destination input to the vehicle's global positioning system (GPS)-based navigation system. Vehicle 100 has arrived, but the driver does not see the destination. Shared-autonomy assistance subsystem 175 perceives that the destination is on the driver's left, and the driver is about to pass the entrance to the strip mall. The model infers that the driver's objective is to enter the strip mall. The subsystem 175 outputs an assistive action 260: turning on the left turn signal and slowing down while alerting the driver (via synthesized speech and/or text) that the sought-after destination is on the left.

In a second sample use case, the human driver of a vehicle 100 is proceeding down a highway at high speed in the center lane and not paying full attention to the road and driving. The driver glances up toward an exit, looks alarmed, and begins to jerk the wheel to the right to exit. The subsystem 175 infers that the driver's objective is to take the exit but also perceives that there is a vehicle in the driver's blind spot and another vehicle behind the vehicle 100 that might intend to undertake. The subsystem 175 outputs an assistive action 260: activating the right turn signal, braking gently, and turning the steering wheel back to the left to keep the vehicle 100 in its current lane to avoid merging into a passing vehicle while signaling intent to other vehicles.

In a third sample use case, the human driver of vehicle 100 is following the navigation system 147 of vehicle 100 under normal conditions on an urban roadway. The subsystem 175 infers that the driver's objective is to drive to a particular destination but also perceives that the vehicle 100 is about to miss the right-hand turn leading to the driver's intended destination. The subsystem 175 outputs an assistive action 260: applying the brakes and turning the steering wheel sharply to the right. The driver reacts by wrestling the wheel back straight again and accelerating past the right turn. In this case, the subsystem 175 infers that its estimation of the driver's objective was inaccurate (e.g., the driver decided, at the last minute, to stop somewhere else first before returning to the original destination). The subsystem 175 cedes control to the driver while resuming passive observation to infer the driver's updated objective (i.e., stopping somewhere else first).

In some embodiments, the subsystem 175 detects, based on sensor data from sensor system 120, that the driver is distracted, and the one or more assistive actions 260 compensate for the driver being distracted, as illustrated in the second sample use case discussed above.

In some embodiments, the subsystem 175 selects the one or more assistive actions 260 based, at least in part, on learned past driving behavior of the driver. For example, the subsystem 175 might have learned that the driver is a cautious driver or an aggressive driver.

In some embodiments, the subsystem 175 poses a question to the driver to confirm the driver's predicted (estimated) objective. For example, if subsystem 175 predicts, perhaps with lower-than-normal probability, that the driver desires to visit a particular shopping center, the virtual assistant might ask, "Are you planning to stop at the Northside Shopping Center up ahead?" The LLM of subsystem 175 can then process the driver's reply to that question before executing one or more assistive actions 260 to assist the driver in reaching the now-confirmed objective, if the driver responds in the affirmative. If the driver responds in the negative, the subsystem 175 can discard its original prediction of the driver's objective and ask additional clarifying questions, if needed, regarding the driver's actual objective, or the subsystem 175 can resume passive observation to infer the driver's mostly likely new objective.

Prior to the deployment of subsystem 175 as described above, the encoder neural networks 220 and LLM 240 are trained. Such training can be updated from time to time in vehicle 100, as needed. Training encoder neural networks 220 involves collecting a large amount of data from people driving around in the real world. From those demonstrations, training data can be retroactively labeled, through hindsight analysis, with what the drivers were trying to do based on what the drivers actually did to support supervised or self-supervised training of the encoder neural networks 220. More specifically, a technique called "hindsight experience replay" can be employed in which it is assumed that a demonstration accomplished whatever the driver actually did and that what the driver did was the driver's objective all along. This process yields labeled data for "If I wanted to accomplish task X, this is how I would do it."

Other techniques and approaches can also be used, in other embodiments. This training process builds a specialized driver-intent-prediction model with the LLM 240 as the foundation. The model thus knows how to predict a driver's intent and understands how a driver is likely to satisfy that intent. The subsystem 175 can learn a scoring function for the best way to accomplish that. For example, the system can learn, via the scoring function, the best types of assistance to provide to the driver to maximize the value, to the driver, of the provided assistance. That is, the system learns how to determine which forms of assistance will best help the driver to accomplish the predicted objective.

In summary, the training process involves gathering a large amount of driving data, labeling the data with regard to goals and demonstrations, and then learning how to predict a driver's objectives and how best to satisfy those objectives. This training process may be termed "specialization" because much of the input data is not text, and the generic LLM, prior to training, does not yet know how to process the data for the specific application of shared autonomy in a vehicle 100. In some embodiments, some of the encoder neural networks 220 might be off-the-shelf (e.g., for object detection and recognition), but others are custom developed (e.g., encoders for vehicle state data, map data 116, etc.). To make the trained subsystem 175 more widely applicable (e.g., to other vehicle models), techniques such as "adapters" can be employed. One common example is a LoRA (Low-Rank Adapter). Such an adapter can augment the capabilities of a base model (e.g., provide text-summarization capability to a LLM that does not already have that capability).

Figure 3:
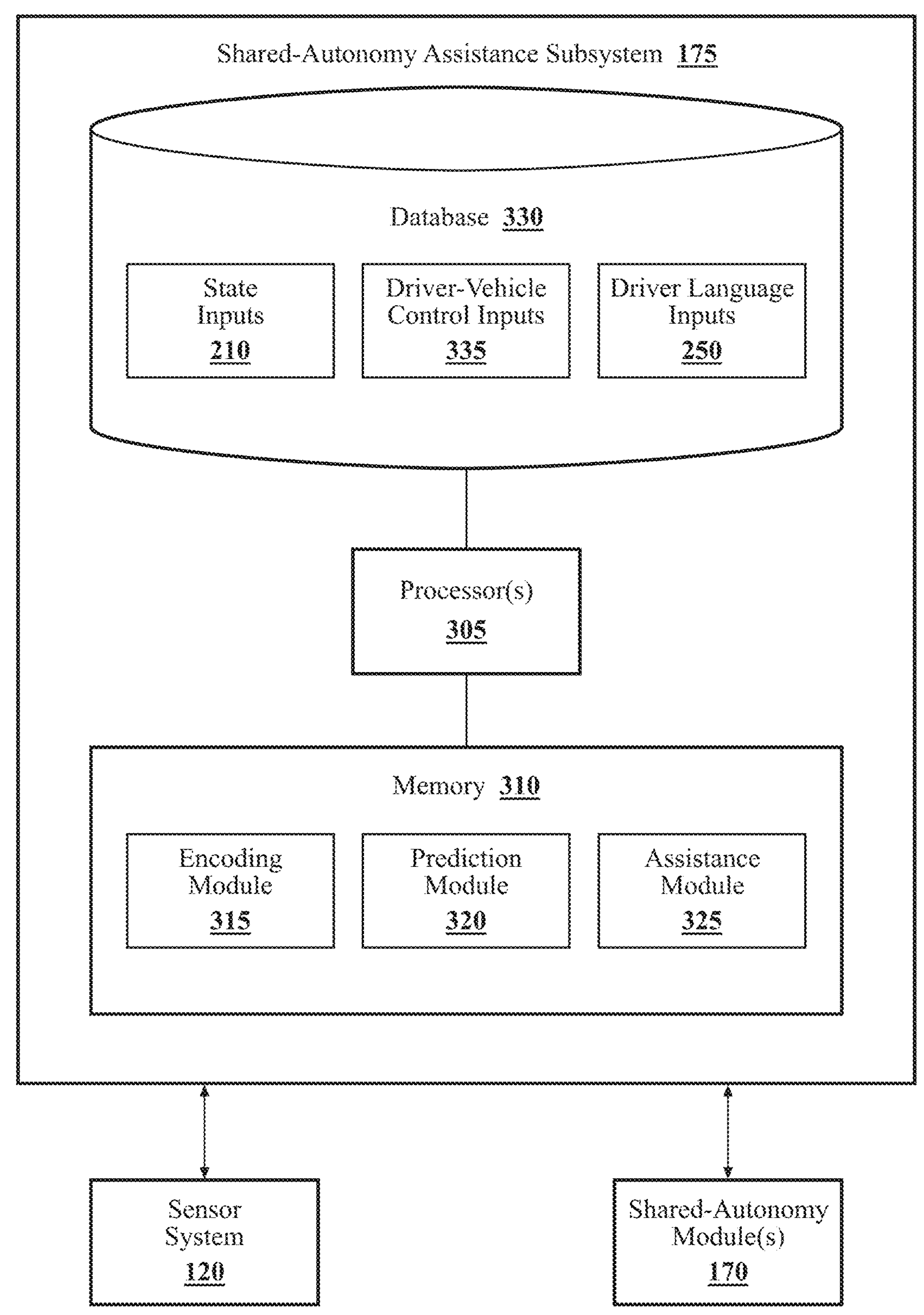
FIG. 3 is a functional block diagram of a shared-autonomy assistance subsystem, in accordance with an illustrative embodiment of the invention.

FIG. 3 is a functional block diagram of a shared-autonomy assistance subsystem 175, in accordance with an illustrative embodiment of the invention. In FIG. 3, the subsystem 175 includes one or more processors 305 to which a memory 310 is communicably coupled. The one or more processors 305 may be dedicated to the system 175, the system 175 may share one or more of the processors 110 of vehicle 100, or the system 175 may access the one or more processors 110 of vehicle 100 through a data bus or another communication path, depending on the embodiment. Memory 310 stores an encoding module 315, a prediction module 320, and an assistance module 325. The memory 310 is a random-access memory (RAM), read-only memory (ROM), a hard-disk drive, a flash memory, or other suitable non-transitory memory for storing the modules 315, 320, and 325. The modules 315, 320, and 325 are, for example, machine-readable instructions that, when executed by the one or more processors 305, cause the one or more processors 305 to perform the various functions disclosed herein.

As shown in FIG. 3, the subsystem 175 interfaces with sensor system 120 and the vehicle's shared-autonomy module(s) 170. As also shown in FIG. 3, the subsystem 175 can store various kinds of data in a database 330. For example, the subsystem 175 can store state inputs 210, driver language inputs 250, and driver vehicle-control inputs 335, all of which are discussed above.

Encoding module 315 generally includes machine-readable instructions that, when executed by the one or more processors 305, cause the one or more processors 305 to process, in a vehicle 100 operating in a shared-autonomy driving mode, inputs (210) including vehicle state information, external-road-agent state information, vehicle environmental sensor data, and map data 116 using one or more encoder neural networks 220 that have been trained to extract features for a LLM 240. As discussed above, the trained encoder neural networks 220 process diverse types of data, including image data, in the state inputs 210 to generate extracted features 230 that can be input to and interpreted by a LLM 240. This enables the LLM 240 to analyze specialized types of data pertaining to vehicles and driving that are beyond the scope of a generic LLM. In some embodiments, the encoder neural networks 220 include VLMs that process image data and/or trajectory encoders that process vehicle-state data (210) and output feature vectors that are input to the LLM 240 and processed by the LLM 240 in a manner similar to how the LLM 240 processes text.

As discussed above, in some embodiments, a driver language input 250 is also input to the LLM 240 (refer to FIG. 2). Such an input, since it is language (speech and/or text), does not require processing by the encoder neural networks 220. In some embodiments, the inputs (state inputs 210) include a driver vehicle-control input 335 that includes at least one of turning a steering wheel of the vehicle 100, operating a throttle of the vehicle 100, and operating a brake of the vehicle 100. Such driver vehicle-control inputs 335 can also be processed by the encoder neural networks 220, enabling the LLM 240 to process that kind of input via the extracted features 230.

Encoding module 315 also includes machine-readable instructions that, when executed by the one or more processors 305, cause the one or more processors 305 to input the extracted features 230 and any other inputs (e.g., a driver language input 250) to the LLM 240.

Prediction module 320 generally includes machine-readable instructions that, when executed by the one or more processors 305, cause the one or more processors 305 to predict, using the LLM 240, an objective of a driver of the vehicle 100. As discussed above, based on the present state inputs 210 and any other inputs (e.g., a driver language input 250), the LLM 240 predicts an objective of the driver of vehicle 100. As discussed above, in some embodiments, the predictive aspect of subsystem 175 is implemented, at least in part, using a diffusion model. As also discussed above, examples of driver objectives (or intentions) include, without limitation, changing lanes; executing a turn at an intersection; merging; exiting a roadway; overtaking another vehicle; remaining in a current lane behind a leading vehicle; and focusing attention on a non-driving activity that distracts the driver from driving, resulting in the vehicle drifting within its lane or exhibiting other aberrant maneuvering.

Assistance module 325 generally includes machine-readable instructions that, when executed by the one or more processors 305, cause the one or more processors 305 to execute, based on an output from the LLM 240, one or more actions (260) to assist the driver in meeting the predicted objective. As discussed above, the one or more actions include controlling, at least in part, operation of the vehicle 100. As discussed above, some or all of the one or more assistive actions 260 can be executed by the shared-autonomy module(s) 170 in the vehicle's shared-autonomy driving system. For example, the LLM 240 can generate actions for execution by the automated-driving aspect of the shared-autonomy system of the vehicle that align with the driver's objective. Such actions involve controlling one or more of steering, acceleration, and braking while, to the extent possible, retaining (acting consistently with) the predicted objective of the driver. In some embodiments, the actions (260) can include controlling other aspects of the operation of the vehicle 100, such as, without limitation, the LLM 240 advising the driver, warning the driver, activating a turn signal, controlling headlight high beams, activating a horn, controlling hazard lights, and/or controlling the vehicle's windshield wipers.

As discussed above, in some embodiments, the subsystem 175 detects, based on sensor data from sensor system 120, that the driver is distracted, and the one or more assistive actions 260 generated by the LLM 240 compensate for the driver being distracted, as illustrated in the second non-limiting sample use case discussed above.

As also discussed above, in some embodiments, the subsystem 175 selects the one or more assistive actions 260 based, at least in part, on learned past driving behavior of the driver. For example, the subsystem 175 can learn, over time, whether the driver is a cautious driver or an aggressive driver. The subsystem 175 can also select assistive actions 260 that have, in the past, proven to be acceptable to the driver in similar situations.

As also discussed above, in some embodiments, the subsystem 175 poses a question to the driver to confirm the driver's predicted (estimated) objective. For example, if subsystem 175 predicts, perhaps with lower-than-normal probability, that the driver desires to visit a particular shopping center, the virtual assistant might ask, "Are you planning to stop at the Northside Shopping Center up ahead?" The LLM of subsystem 175 can then process the driver's reply to that question before executing one or more assistive actions 260 to assist the driver in reaching the now-confirmed objective, if the driver responds in the affirmative. If the driver responds in the negative, the subsystem 175 can discard its original prediction of the driver's objective and ask additional clarifying questions, if needed, regarding the driver's actual objective.

Figure 4:
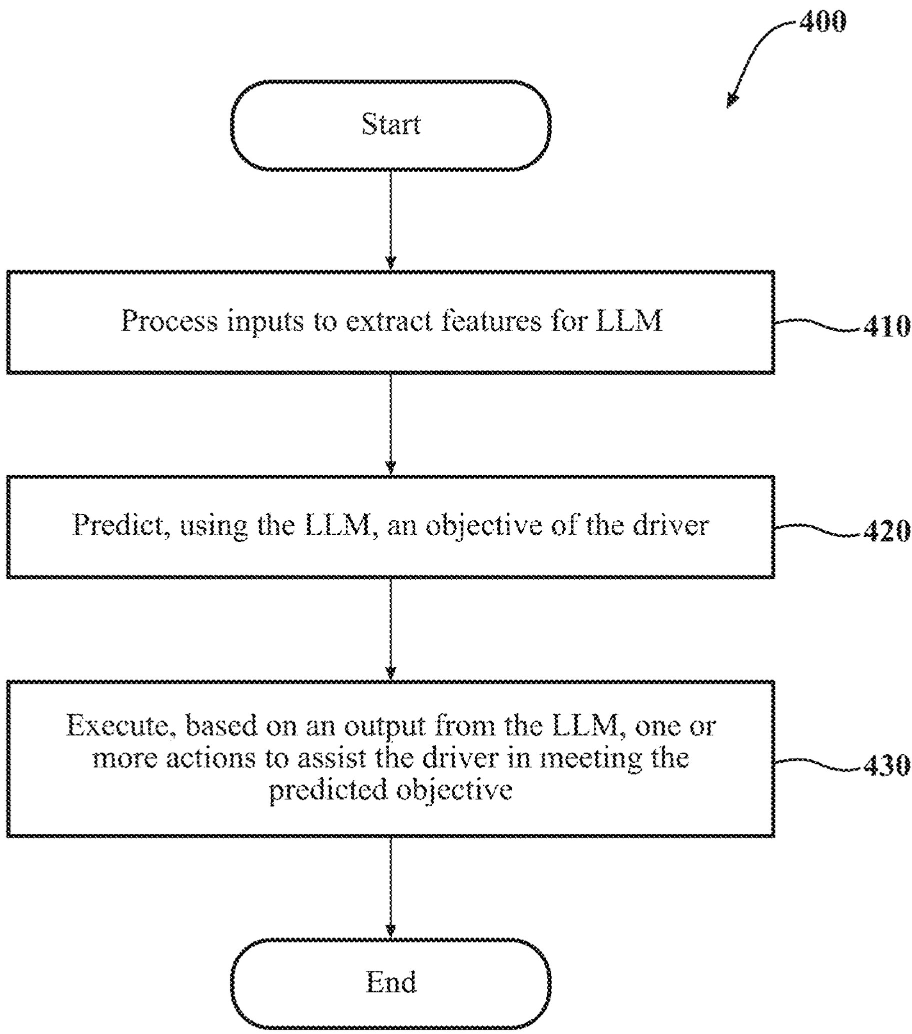
FIG. 4 is a flowchart of a method of assisting a driver using a foundation model in a shared-autonomy driving mode of a vehicle, in accordance with an illustrative embodiment of the invention.

FIG. 4 is a flowchart of a method 400 of assisting a driver using a foundation model in a shared-autonomy driving mode of a vehicle, in accordance with an illustrative embodiment of the invention. Method 400 will be discussed from the perspective of shared-autonomy assistance subsystem 175 in FIG. 3. While method 400 is discussed in combination with shared-autonomy assistance subsystem 175, it should be appreciated that method 400 is not limited to being implemented within subsystem 175, but subsystem 175 is instead one example of a system that may implement method 400.

At block 410, encoding module 315 processes, in a vehicle 100 operating in a shared-autonomy driving mode, inputs (210) including vehicle state information, external-road-agent state information, vehicle environmental sensor data, and map data 116 using one or more encoder neural networks 220 that have been trained to extract features 230 for a LLM 240. As discussed above, the trained encoder neural networks 220 process diverse types of data, including image data, in the state inputs 210 to generate extracted features 230 that can be input to and interpreted by a LLM 240. This enables the LLM 240 to analyze specialized types of data pertaining to vehicles and driving that are beyond the scope of a generic LLM. In some embodiments, the encoder neural networks 220 include VLMs that process image data and output feature vectors that are input to the LLM 240 and processed by the LLM 240 in a manner similar to how the LLM 240 processes text. At block 410, encoding module 315 also inputs the extracted features 230 and any other inputs (e.g., a driver language input 250) to the LLM 240. As discussed above, a driver language input 250, since it is language (speech and/or text), does not require processing by the encoder neural networks 220. In some embodiments, the inputs (state inputs 210) include a driver vehicle-control input 335 that includes at least one of turning a steering wheel of the vehicle 100, operating a throttle of the vehicle 100, and operating a brake of the vehicle 100. Such driver vehicle-control inputs 335 can also be processed by the encoder neural networks 220, enabling the LLM 240 to process that kind of input via the extracted features 230.

At block 420, prediction module 320 predicts, using the LLM 240, an objective of a driver of the vehicle 100. As discussed above, based on the present state inputs 210 and any other inputs (e.g., a driver language input 250), the LLM 240 predicts an objective of the driver of vehicle 100. As discussed above, examples of driver objectives (or intentions) include, without limitation, changing lanes; executing a turn at an intersection; merging; exiting a roadway; overtaking another vehicle; remaining in a current lane behind a leading vehicle; and focusing attention on a non-driving activity that distracts the driver from driving, resulting in the vehicle drifting within its lane.

At block 430, assistance module 325 executes, based on an output from the LLM 240, one or more actions (260) to assist the driver in meeting the predicted objective. The one or more actions (260) include controlling, at least in part, operation of the vehicle 100. As discussed above, some or all of the one or more assistive actions 260 can be executed by the shared-autonomy module(s) 170 in the vehicle's shared-autonomy driving system. For example, the LLM 240 can generate actions for execution by the automated-driving aspect of the shared-autonomy system of the vehicle that align with the driver's objective. Such actions involve controlling, at least in part, one or more of steering, acceleration, and braking while, to the extent possible, retaining (acting consistently with) the predicted objective of the driver. In some embodiments, the actions can include controlling other aspects of the operation of the vehicle 100, such as, without limitation, the LLM 240 advising the driver, warning the driver, activating a turn signal, controlling headlight high beams, activating a horn, controlling hazard lights, and/or controlling the vehicle's windshield wipers.

In some embodiments, method 400 includes additional actions. For example, as discussed above, in some embodiments the subsystem 175 detects, based on sensor data from sensor system 120, that the driver is distracted, and the one or more assistive actions 260 generated by the LLM 240 compensate for the driver being distracted, as illustrated in the second sample use case discussed above. As also discussed above, in some embodiments, the subsystem 175 selects the one or more assistive actions 260 based, at least in part, on learned past driving behavior of the driver. As also discussed above, in some embodiments, the subsystem 175 poses a question to the driver and processes a reply from the driver to confirm the predicted objective before executing the one or more actions (260).

FIG. 1 will now be discussed in full detail as an example vehicle environment within which the systems and methods disclosed herein may be implemented. In some instances, the vehicle 100 can be configured to switch selectively between an automated mode, one or more semi-automated operational modes, and/or a manual mode. Such switching, also referred to as handover when transitioning to a manual mode, can be implemented in a suitable manner, now known or later developed. "Manual mode" means that all of or a majority of the navigation and/or maneuvering of the vehicle is performed according to inputs received from a user (e.g., human driver/operator).

In one or more implementations, the vehicle 100 can be an automated vehicle. As used herein, "automated vehicle" refers to a vehicle that operates in an automated mode. "Automated mode" refers to navigating and/or maneuvering a vehicle along a travel route using one or more computing devices to control the vehicle with minimal or no input from a human driver/operator. In one implementation, the vehicle 100 is configured with one or more semi-automated operational modes in which one or more computing devices perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route. Thus, in one or more implementations, the vehicle 100 operates autonomously according to a particular defined level of autonomy.

The vehicle 100 can include one or more processors 110. In one or more arrangements, the one or more processors 110 can be a main processor of the vehicle 100. For instance, the one or more processors 110 can be an electronic control unit (ECU). The vehicle 100 can include one or more data stores 115 for storing one or more types of data. The data store(s) 115 can include volatile and/or non-volatile memory. Examples of suitable data stores 115 include RAM, flash memory, ROM, PROM (Programmable Read-Only Memory), EPROM, EEPROM (Electrically Erasable Programmable Read-Only Memory), registers, magnetic disks, optical disks, hard drives, or any other suitable storage medium, or any combination thereof. The data store(s) 115 can be a component(s) of the one or more processors 110, or the data store(s) 115 can be operatively connected to the one or more processors 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangement, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangement, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can function independently from each other. Alternatively, two or more of the sensors can work in combination with each other. In such a case, the two or more sensors can form a sensor network. The sensor system 120 and/or the one or more sensors can be operatively connected to the one or more processors 110, the data store(s) 115, and/or another element of the vehicle 100 (including any of the elements shown in FIG. 1).

The sensor system 120 can include any suitable type of sensor. Various examples of different types of sensors will be described herein. However, it will be understood that the implementations are not limited to the particular sensors described. The sensor system 120 can include one or more vehicle sensors 121. The vehicle sensors 121 can detect, determine, and/or sense information about the vehicle 100 itself, including the operational status of various vehicle components and systems.

In one or more arrangements, the vehicle sensors 121 can be configured to detect, and/or sense position and/orientation changes of the vehicle 100, such as, for example, based on inertial acceleration. In one or more arrangements, the vehicle sensors 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensors 121 can be configured to detect, and/or sense one or more characteristics of the vehicle 100. In one or more arrangements, the vehicle sensors 121 can include a speedometer to determine a current speed of the vehicle 100.

Alternatively, or in addition, the sensor system 120 can include one or more environment sensors 122 configured to acquire, and/or sense driving environment data. "Driving environment data" includes any data or information about the external environment in which a vehicle is located or one or more portions thereof. For example, the one or more environment sensors 122 can be configured to detect, quantify, and/or sense obstacles in at least a portion of the external environment of the vehicle 100 and/or information/data about such obstacles. The one or more environment sensors 122 can be configured to detect, measure, quantify, and/or sense other things in at least a portion the external environment of the vehicle 100, such as, for example, nearby vehicles, lane markers, signs, traffic lights, traffic signs, lane lines, crosswalks, curbs proximate the vehicle 100, off-road objects, etc.

Various examples of sensors of the sensor system 120 are discussed above. The example sensors may be part of the one or more environment sensors 122 and/or the one or more vehicle sensors 121. Moreover, the sensor system 120 can include operator sensors that function to track or otherwise monitor aspects related to the driver/operator of the vehicle 100. However, it will be understood that the implementations are not limited to the particular sensors described. As an example, in one or more arrangements, the sensor system 120 can include one or more radar sensors 123, one or more LIDAR sensors 124, one or more sonar sensors 125, and/or one or more cameras 126.

The vehicle 100 can further include a communication system 130. The communication system 130 can include one or more components configured to facilitate communication between the vehicle 100 and one or more communication sources. Communication sources, as used herein, refers to people or devices with which the vehicle 100 can communicate with, such as external networks, computing devices, operator or occupants of the vehicle 100, or others. As part of the communication system 130, the vehicle 100 can include an input system 131. An "input system" includes any device, component, system, element or arrangement or groups thereof that enable information/data to be entered into a machine. In one or more examples, the input system 131 can receive an input from a vehicle occupant (e.g., a driver or a passenger). The vehicle 100 can include an output system 132. An "output system" includes any device, component, or arrangement or groups thereof that enable information/data to be presented to the one or more communication sources (e.g., a person, a vehicle passenger, etc.). The communication system 130 can further include specific elements which are part of or can interact with the input system 131 or the output system 132, such as one or more display device(s) 133, and one or more audio device(s) 134 (e.g., speakers and microphones).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combinations thereof, now known or later developed.

The one or more processors 110 and/or the automated driving module(s) 160 can be operatively connected to communicate with the various vehicle systems 140 and/or individual components thereof. For example, returning to FIG. 1, the one or more processors 110 and/or the automated driving module(s) 160 can be in communication to send and/or receive information from the various vehicle systems 140 to control the movement, speed, maneuvering, heading, direction, etc. of the vehicle 100. The one or more processors 110 and/or the automated driving module(s) 160 may control some or all of these vehicle systems 140 and, thus, may be partially or fully automated.

The vehicle 100 can include one or more modules, at least some of which are described herein. The modules can be implemented as computer-readable program code that, when executed by a processor 110, implement one or more of the various processes described herein. The processor 110 can be a device, such as a CPU, which is capable of receiving and executing one or more threads of instructions for the purpose of performing a task. One or more of the modules can be a component of the one or more processors 110, or one or more of the modules can be executed on and/or distributed among other processing systems to which the one or more processors 110 is operatively connected. The modules can include instructions (e.g., program logic) executable by one or more processors 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

In some implementations, the vehicle 100 can include one or more automated driving modules 160. The automated driving module(s) 160 can be configured to receive data from the sensor system 120 and/or any other type of system capable of capturing information relating to the vehicle 100 and/or the external environment of the vehicle 100. In one or more arrangements, the automated driving module(s) 160 can use such data to generate one or more driving scene models. The automated driving module(s) 160 can determine the position and velocity of the vehicle 100. The automated driving module(s) 160 can determine the location of obstacles, or other environmental features including traffic signs, trees, shrubs, neighboring vehicles, pedestrians, etc.

The automated driving module(s) 160 can be configured to determine travel path(s), current automated driving maneuvers for the vehicle 100, future automated driving maneuvers and/or modifications to current automated driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The automated driving module(s) 160 can be configured to implement determined driving maneuvers. The automated driving module(s) 160 can cause, directly or indirectly, such automated driving maneuvers to be implemented. As used herein, "cause" or "causing" means to make, command, instruct, and/or enable an event or action to occur or at least be in a state where such event or action may occur, either in a direct or indirect manner. The automated driving module(s) 160 can be configured to execute various vehicle functions and/or to transmit data to, receive data from, interact with, and/or control the vehicle 100 or one or more systems thereof (e.g., one or more of vehicle systems 140). The noted functions and methods will become more apparent with a further discussion of the figures.

Detailed implementations are disclosed herein. However, it is to be understood that the disclosed implementations are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various implementations are shown in FIGS. 1-4, but the implementations are not limited to the illustrated structure or application.

The flowcharts and block diagrams in the figures illustrate the architecture, functionality, and operation of possible implementations of systems, methods, and computer program products according to various implementations. In this regard, each block in the flowcharts or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can be executed substantially concurrently, or the blocks can sometimes be executed in the reverse order, depending upon the functionality involved.

The systems, components and/or methods described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or methods also can be embedded in a computer-readable storage, such as a computer program product or other data programs storage device, readable by a machine, tangibly embodying a program of instructions executable by the machine to perform methods and methods described herein. These elements also can be embedded in an application product which comprises all the features enabling the implementation of the methods described herein and, which when loaded in a processing system, is able to carry out these methods.

Furthermore, arrangements described herein can take the form of a computer program product embodied in one or more computer-readable media having computer-readable program code embodied or embedded, such as stored thereon. Any combination of one or more computer-readable media can be utilized. The computer-readable medium can be a computer-readable signal medium or a computer-readable storage medium. The phrase "computer-readable storage medium" means a non-transitory storage medium. A computer-readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a RAM, a ROM, an EPROM or Flash memory, an optical fiber, a portable compact disc read-only memory (CD-ROM), a digital versatile disc (DVD), an optical storage device, a magnetic storage device, or any suitable combination of the foregoing. In the context of this document, a computer-readable storage medium can be any tangible medium that can contain, or store a program for use by, or in connection with, an instruction execution system, apparatus, or device.

Program code embodied on a computer-readable medium can be transmitted using any appropriate medium, including but not limited to wireless, wireline, optical fiber, cable, RF, etc., or any suitable combination of the foregoing. Computer program code for carrying out operations for aspects of the present arrangements can be written in any combination of one or more programming languages, including an object-oriented programming language such as Java™, Smalltalk, C++ or the like and conventional procedural programming languages, such as the "C" programming language, Python, or similar programming languages. The program code can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a LAN or a WAN, or the connection can be made to an external computer (for example, through the Internet using an Internet Service Provider).

In the description above, certain specific details are outlined in order to provide a thorough understanding of various implementations. However, one skilled in the art will understand that the invention may be practiced without these details. In other instances, well-known structures have not been shown or described in detail to avoid unnecessarily obscuring descriptions of the implementations. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Reference throughout this specification to "one or more implementations" or "an implementation" means that a particular feature, structure or characteristic described in connection with the implementation is included in at least one or more implementations. Thus, the appearances of the phrases "in one or more implementations" or "in an implementation" in various places throughout this specification are not necessarily all referring to the same implementation. Furthermore, the particular features, structures, or characteristics may be combined in any suitable manner in one or more implementations. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings (such as "Background" and "Summary") and sub-headings used herein are intended only for general organization of topics within the present disclosure and are not intended to limit the disclosure of the technology or any aspect thereof. The recitation of multiple implementations having stated features is not intended to exclude other implementations having additional features, or other implementations incorporating different combinations of the stated features. As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an implementation can or may comprise certain elements or features does not exclude other implementations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an implementation or particular system is included in at least one or more implementations or aspect. The appearances of the phrase "in one aspect" (or variations thereof) are not necessarily referring to the same aspect or implementation. It should also be understood that the various method steps discussed herein do not have to be carried out in the same order as depicted, and not each method step is required in each aspect or implementation.

Generally, "module," as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions. The term "module," as used herein, is not intended, under any circumstances, to invoke interpretation of the appended claims under 35 U.S.C. § 112(f).

The terms "a" and "an," as used herein, are defined as one as or more than one. The term "plurality," as used herein, is defined as two or more than two. The term "another," as used herein, is defined as at least a second or more. The terms "including" and/or "having," as used herein, are defined as including (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

The preceding description of the implementations has been provided for purposes of illustration and description. It is not intended to be exhaustive or to limit the disclosure. Individual elements or features of a particular implementation are generally not limited to that particular implementation, but, where applicable, are interchangeable and can be used in a selected implementation, even if not specifically shown or described. The same may also be varied in many ways. Such variations should not be regarded as a departure from the disclosure, and all such modifications are intended to be included within the scope of the disclosure.

While the preceding is directed to implementations of the disclosed devices, systems, and methods, other and further implementations of the disclosed devices, systems, and methods can be devised without departing from the basic scope thereof. The scope thereof is determined by the claims that follow.

What is claimed is:

1. A system, comprising:

a processor; and a memory storing machine-readable instructions that, when executed by the processor, cause the processor to:

process, in a vehicle operating in a shared-autonomy driving mode, inputs including a driver vehicle-control input that includes at least one of turning a steering wheel of the vehicle, operating a throttle of the vehicle, or operating a brake of the vehicle, vehicle state information, external-road-agent state information, vehicle environmental sensor data, and map data using one or more encoder neural networks that have been trained to extract features for a large language model (LLM);

input the extracted features to the LLM;

predict, using the LLM based on the extracted features, an objective of a driver of the vehicle; and execute, based on an output from the LLM, one or more actions to assist the driver in meeting the predicted objective, wherein the one or more actions include controlling, at least in part, operation of the vehicle.

2. The system of claim 1, wherein the machine-readable instructions include further instructions that, when executed by the processor, cause the processor to input, to the LLM, a driver language input that includes at least one of speech or text.

3. The system of claim 1, wherein the predicted objective is one of changing lanes, remaining in a current lane, merging, exiting a roadway, overtaking another vehicle, and executing a turn at an intersection.

4. The system of claim 1, wherein the controlling, at least in part, the operation of the vehicle, includes controlling at least one of steering, acceleration, or braking while retaining the predicted objective of the driver.

5. The system of claim 1, wherein the LLM selects the one or more actions based, at least in part, on learned past driving behavior of the driver and the one or more actions include at least one of the LLM advising the driver, the LLM warning the driver, the LLM activating a turn signal, the LLM controlling headlight high beams, the LLM activating a horn, the LLM controlling hazard lights, or the LLM controlling windshield wipers.

6. The system of claim 1, wherein the LLM detects, based on the extracted features, that the driver is distracted and the one or more actions compensate for the driver being distracted.

7. The system of claim 1, wherein the machine-readable instructions include further instructions that, when executed by the processor, cause the processor to output, from the LLM, a question to the driver and to process, via the LLM, a reply from the driver to confirm the predicted objective before executing the one or more actions.

8. A non-transitory computer-readable medium storing instructions that, when executed by a processor, cause the processor to:

process, in a vehicle operating in a shared-autonomy driving mode, inputs including a driver vehicle-control input that includes at least one of turning a steering wheel of the vehicle, operating a throttle of the vehicle, or operating a brake of the vehicle, vehicle state information, external-road-agent state information, vehicle environmental sensor data, and map data using one or more encoder neural networks that have been trained to extract features for a large language model (LLM);

input the extracted features to the LLM;

predict, using the LLM based on the extracted features, an objective of a driver of the vehicle; and execute, based on an output from the LLM, one or more actions to assist the driver in meeting the predicted objective, wherein the one or more actions include controlling, at least in part, operation of the vehicle.

9. The non-transitory computer-readable medium of claim 8, wherein the controlling, at least in part, the operation of the vehicle, includes controlling at least one of steering, acceleration, or braking while retaining the predicted objective of the driver.

10. The non-transitory computer-readable medium of claim 8, wherein the LLM selects the one or more actions based, at least in part, on learned past driving behavior of the driver and the one or more actions include at least one of the LLM advising the driver, the LLM warning the driver, the LLM activating a turn signal, the LLM controlling headlight high beams, the LLM activating a horn, the LLM controlling hazard lights, or the LLM controlling windshield wipers.

11. The non-transitory computer-readable medium of claim 8, wherein the instructions include further instructions that, when executed by the processor, cause the processor to output, from the LLM, a question to the driver and to process, via the LLM, a reply from the driver to confirm the predicted objective before executing the one or more actions.

12. A method, comprising:

processing, in a vehicle operating in a shared-autonomy driving mode, inputs including a driver vehicle-control input that includes at least one of turning a steering wheel of the vehicle, operating a throttle of the vehicle, or operating a brake of the vehicle, vehicle state information, external-road-agent state information, vehicle environmental sensor data, and map data using one or more encoder neural networks that have been trained to extract features for a large language model (LLM) and inputting the extracted features to the LLM;

predicting, using the LLM based on the extracted features, an objective of a driver of the vehicle; and executing, based on an output from the LLM, one or more actions to assist the driver in meeting the predicted objective, wherein the one or more actions include controlling, at least in part, operation of the vehicle.

13. The method of claim 12, further comprising inputting, to the LLM, a driver language input that includes at least one of speech or text.

14. The method of claim 12, wherein the predicted objective is one of changing lanes, remaining in a current lane, merging, exiting a roadway, overtaking another vehicle, and executing a turn at an intersection.

15. The method of claim 12, wherein the controlling, at least in part, the operation of the vehicle, includes controlling at least one of steering, acceleration, or braking while retaining the predicted objective of the driver.

16. The method of claim 12, wherein the LLM selects the one or more actions based, at least in part, on learned past driving behavior of the driver and the one or more actions include at least one of the LLM advising the driver, the LLM warning the driver, the LLM activating a turn signal, the LLM controlling headlight high beams, the LLM activating a horn, the LLM controlling hazard lights, or the LLM controlling windshield wipers.

17. The method of claim 12, wherein the LLM detects, based on the extracted features, that the driver is distracted and the one or more actions compensate for the driver being distracted.

18. The method of claim 12, further comprising outputting, from the LLM, a question to the driver and processing, via the LLM, a reply from the driver to confirm the predicted objective before executing the one or more actions.

* * * * *